United States Patent [19]

Potucek

[11] Patent Number: 4,973,211
[45] Date of Patent: * Nov. 27, 1990

[54] STAR FASTENERS

[75] Inventor: Frank R. Potucek, Palmetto, Fla.

[73] Assignee: Star Fasteners International, Inc., Savannah, Ga.

[*] Notice: The portion of the term of this patent subsequent to Jul. 5, 2005 has been disclaimed.

[21] Appl. No.: 181,777

[22] Filed: Apr. 15, 1988

Related U.S. Application Data

[63] Continuation-in-part of Ser. No. 1,693, Jan. 9, 1987, Pat. No. 4,755,091, which is a continuation-in-part of Ser. No. 721,757, Apr. 10, 1985, abandoned.

[51] Int. Cl.⁵ .............................................. F16B 15/08
[52] U.S. Cl. .................................... 411/452; 411/456; 411/920
[58] Field of Search ................................. 411/451–457, 411/488, 489, 490, 922, 920

[56] References Cited

U.S. PATENT DOCUMENTS

| 18,294 | 9/1857 | Newton | 411/452 |
|---|---|---|---|
| 54,253 | 5/1866 | Boardman | 411/452 |
| 340,692 | 4/1886 | Bailey | 411/452 |
| 895,080 | 8/1908 | Eisenreich | 411/452 |
| 902,935 | 11/1908 | Bricker | 411/451 |
| 1,001,612 | 8/1911 | Bricker | 411/451 |
| 1,103,542 | 7/1914 | Russell | 411/451 |
| 1,134,160 | 4/1915 | Russell | 411/451 |
| 1,649,049 | 11/1927 | Williams | 411/454 |
| 2,269,708 | 1/1942 | Dickson | 411/453 |
| 3,764,278 | 10/1973 | Ivanier | 411/453 |
| 3,969,975 | 7/1976 | Krol | 411/457 |

FOREIGN PATENT DOCUMENTS

| 471134 | 2/1929 | Fed. Rep. of Germany | 411/451 |
|---|---|---|---|
| 1048465 | 8/1950 | France | 411/452 |
| 468601 | 1/1952 | Italy | 411/452 |
| 127167 | 1/1950 | Sweden | 411/452 |
| 1342 | of 1856 | United Kingdom | 411/454 |
| 14 | of 1859 | United Kingdom | 411/454 |
| 1504 | of 1896 | United Kingdom | 411/452 |

*Primary Examiner*—Neill R. Wilson
*Attorney, Agent, or Firm*—Joseph C. Mason; Ronald E. Smith

[57] ABSTRACT

A star shaped fastener having at least three fins radiating from a central core with the fin-included angle in a five finned embodiment being between 72 to 98 degrees which configuration reduces the fabricated material by 50% and increases the surface area by 15%–85% compared to a common round nail of equal radius.

44 Claims, 3 Drawing Sheets

STAR FASTENERS

CROSS-REFERENCE TO RELATED APPLICATIONS

This disclosure is a continuation-in-part of my co-pending application entitled "Star Fastener" bearing Ser. No. 07/001,693 and filing date Jan. 9, 1987, now U.S. Pat. No. 4,755,091 which latter disclosure is a continuation-in-part of an earlier application by the same title, bearing Ser. No. 06/721,757 and filing date Apr. 10, 1985, now abandoned.

TECHNICAL FIELD

This invention relates to fastener improvements and particularly to fasteners usable as strip or coil fasteners for powered hammering tools.

BACKGROUND ART

There are many nails in use including the common and finishing smooth shank nails, the ring shank nail for increased holding power beyond that of a common round nail, the deformed shank nail including the twisted square, rectangular, spiral or screw type grooved shank nail, triangular shaped nails and the hardened masonry nails. The above-mentioned nails are designed for various purposes but none accomplishes a substantial reduction in fastener material while substantially inhibiting lateral movement between a pair of wooden members connected by the fastener in accord with this invention. Also, the holding power of the nails of the prior art are not as effective as is often needed and none measures up to the holding power of the fastener in accord with this invention. Many of the nails of the prior art are furthermore wasteful as being fabricated from an excess of steel, aluminum or other metals which is of increasingly important competitive consideration.

The prior art nails are unsuitable in many wood constructions and when used often cause splitting of the wood along the grain. For example, a common round or square or rectangular nail when driven into wood tends to drive the grain apart or to split the same, creating a "fish-eye" condition of the grain around the nail shank. Thus, frictional contact between the common nail and the wood is less than complete and there is no tight fit about the shank thus reducing the holding power of the driven nail into the wood.

The fastener in accord with this invention overcomes many of the aforementioned problems of one or more of the prior art nails mentioned above and substantially alleviates all of the aforementioned shortcomings of the prior art as will be readily understood by consideration of the entire specification, drawings and claims herein.

The improved fastener in accord with several aspects of the invention is seen to include an elongated shank having opposite end portions and at least one longitudinal axis extending between the end portions, and an elongated central core with at least ten spaced elongated side walls forming with the core a cross-sectional shape of at least a five-pointed star. In a first embodiment of the invention, each adjacent pair of side walls taper toward each other and form a radial fin. One side wall of each pair of adjacent fins forms a vertically extending V-shaped cup having its valley juxtaposed to the core. The fins include elongated edges extending substantially parallel to the longitudinal axis and terminate outwardly generally equally from the longitudinal axis. The edges are rounded to inhibit breakage thereof during driving of the fastener into material. The sides forming the cups receive therein compressible material into which the fastener is drivingly disposed to compress material in the cups between the sides to enhance the holding power of the fastener in the material. The material is compressed downwardly and laterally into the cups to increase the holding power of the fastener in the material. The sides of the cups are substantially planar with the sides of radially adjacent fins being generally perpendicular. A valley having a curved surface integral with the core is formed between the adjacent side walls of radially adjacent pair of fins with the angle therebetween being substantially perpendicular. The edges of the fins have a radial dimension from the core at least equal to the diameter of the core.

In an alternate form, the fastener includes another shank having another longitudinal axis substantially parallel to the longitudinal axis and a bridging portion therebetween forming a head therefor to be driven as a staple. Preferably, the shank has a cross-sectional shape of at least a five-pointed star. The fastener may have one end portion tapered at an angle less than fourteen degrees to enhance the holding power of the fastener in material. A head is often provided on the other end portion for driving same with a hammer or the like into material and often a point is provided on the other one end portion. The shank is contemplated to be substantially uniformly tapered from the smaller dimension at one end portion to the other end portion at an angle less than fourteen degrees to enhance the holding power of the fastener in material such as a roof or concrete.

In yet another alternate form, the fastener includes shoulder means in the cups spaced along the shank to further enhance the holding power thereof. When the fastener includes a tapered portion the shoulder means in the cups may be spaced along only the tapered portion of the shank or the entire shank. The shoulder means are provided in at least three of the cups but may be provided in all of the vertical cups. The shoulder means extend or protrude outwardly away from the longitudinal axis. The shoulder means preferably are located at the core and the facing side walls and merge flush with the core and the facing side walls of the fins. In yet other alternative aspects the shank may include six, seven or more fins; the respective cross-sectional shape being a commensurate pointed star.

The final embodiment of this invention employs no more materials than the first embodiment, yet provides an increased surface area and increased tensile strength vis a vis said first embodiment. The diameter of the central core of the fastener of the final embodiment is reduced relative to the central core of the first embodiment, and the "saved" material is added to the fins so that said fins extend radially further from the longitudinal axis of the fastener.

Moreover, the sidewalls of the final embodiment are parallel to one another, as distinguished from the converging side walls of the first embodiment. The angle between adjacent fins (the fin-included angle) is reduced from the 98 degree angle of the first embodiment to 72 degrees in the final embodiment. It is believed that said respective angles represent the optimal upper and lower limits, respectively, for the angle between the fins. Fin-included angles beyond said upper and lower limits result in bulbous or scalloped fins, respectively.

The fastener core and fins radially extending therefrom in accord with the invention provide an increased outer surface area over that of a common round nail of a radius equal to the distance of the fastener from the longitudinal axis to one of the edges. It also provides easier drivability and superior holding power over other known hammerable fasteners. Each cup extends throughout substantially the length of the shank to form an elongated cupping means into which fibers of a pair of wooden members will be compressed downwardly and laterally during driving of the fastener into a pair of wooden members. This configuration substantially inhibits lateral movement between a pair of wooden members into which the fastener connects and enhances the holding power thereof.

The improved fastener end portions and at least one longitudinal axis extending between includes at least five equally spaced narrow fins extending radially outwardly from the core of a predetermined cross-section and extend substantially parallel to the longitudinal axis of the core. The fins include elongated edges extending in the same direction as the longitudinal axis with each adjacent pair of fins forming a vertically extending V-shaped cup having its valley juxtaposed to the core. The side walls compress compressible material downwardly and laterally into the V-shaped cups to increase the holding power of the fastener in material beyond that of prior art fasteners while substantially reducing the amount of material forming the fastener.

It is an object of this invention to advance the art of nail making in a pioneering manner by providing nails that use only about half the materials required to make a common round shank nail while increasing tensile strength and surface area without appreciably sacrificing ductility.

Another object is to advance the art by not only disclosing five pointed, star cross-sectional nails that achieve the first-mentioned object, but to teach the art the upper and lower limits of the angles between the fins that form a part of the improved nail.

The invention accordingly comprises the features of construction, combination of elements and arrangement of parts that will be exemplified in the construction hereinafter set forth and the scope of the invention will be indicated in the claims.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Similar reference numerals refer to similar parts throughout the several views of the drawings.

DETAILED DESCRIPTION OF THE PREFERRED EMBODIMENTS

Figure 1:
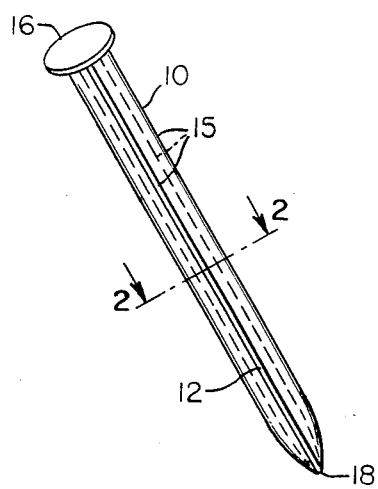
FIG. 1 is an isometric view of the fastener in the form of a nail in accord with a first embodiment of the invention.
Figure 2:
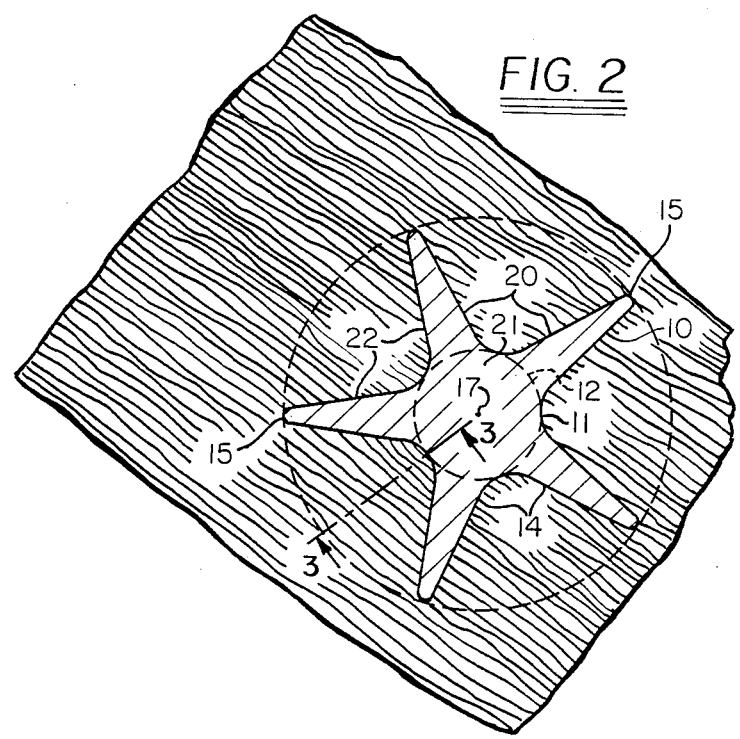
FIG. 2 is an enlarged cross-sectional view taken along line 2—2 of FIG. 1 and showing the fastener driven into the wood.
Figure 3:
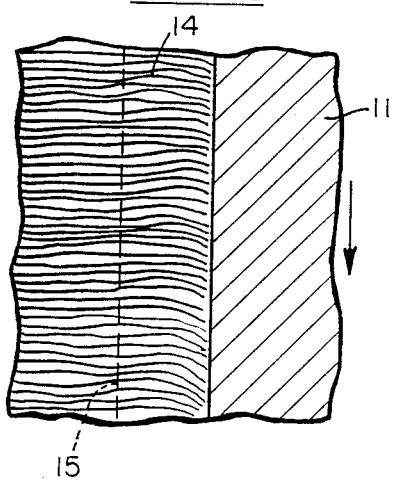
FIG. 3 is an enlarged partial vertical sectional view of the fastener taken along line 3—3 of FIG. 2 and showing the sheared wood fibers in a compressed state in a fastener vertical cup.

In FIGS. 1—3 the improved fastener 10 in accord with a first embodiment of this invention includes an elongated shank 11 having a central cylindrical core 12 and at least five spaced tapering fins 14 extending radially outwardly therefrom and terminating in smooth and rounded outer edges 15 forming a five-pointed star in cross-section for the shank 11. At the upper end of shank 11 is a rounded head 16 which normally would extend outwardly at least to cover all of the edges 15, i.e., the radius of 16 would at least be the distance between longitudinal axis, indicated by point and numbered 17 in FIG. 2, and the edges 15. However, it is to be understood that the head 16 may be in the form of a finishing nail head. At the opposite end of shank 11 is preferably a point 18 as is normally provided on nails, particularly nails to be used in wood materials.

When a common nail (round, square or rectangular) is driven into wood, the nail tends often to drive the grain apart or to split same to create a "fish-eye" condition about the common nail shank. If the "fish-eye" is created, frictional contact between the wood and nail diminishes and materially effects the holding power of the driven nail into the wood. Rather than merely driving a common nail into the wood material, in accord with this invention, the nail 10, as seen in FIGS. 2 and 3 causes the fibers to be compressed laterally into the cup 20 (FIG. 2) formed between adjacent fins 14, as well as downwardly as illustrated in FIG. 3 to provide a dual wedging action. This causes substantially increased holding power while not having any two edges 15 aligned with the grain. This condition would often be the case with a prior art rectangular nail, for example, which often increases the probability of creating a "fish-eye" or uneven holding power on various sides of such prior art nail.

It is seen in FIG. 2 that between each pair of adjacent fins 14, facing side walls 22 form a vertical extending valley or cup 20 which has a base 21 defined by a smooth curved and merging surface from the core 12 to the edges 15 of the adjacent fins 14. With at least five such vertical cups 20 it is very probable that at least one vertical cup 20 having side walls 22 will be substantially completely in alignment with the wood grain and accordingly will have greater cam locking action or wedging action and holding power than the other partially aligned vertical cups 20.

In practice the edges 15 should be smoothly rounded to inhibit breakage during driving thereof into material. As seen in FIG. 2, the cups 20 have the contour of a right angle. Therefore, the surface area of the nail of this invention includes about fifteen percent (15%) increase in surface area over a common round nail of a radius equal to the distance of the improved nail from the longitudinal axis 17 to the edge 15 of the fins 14. This also enhances the resistive holding power. Thus, it is seen that the surface area contact compared between the improved fastener 10 and the common round nail has to be no less than equal in resistive holding power, but is markedly increased by approximately sixty percent (60%) because of the dual wedging action in the vertical cups 20 and 21 with the compression of the fibers both laterally and downwardly. Also, the five sided star fastener 10 with substantially ninety degree cups 20 creates a central or core cross-sectional area 12 for frictional forces of the severed and compressed wood grain which also forces the grain to bend downwardly for cam locking action between the material and the fastener 10, unlike a prior art cross shaped or plus shaped (+) nail.

Figure 4:
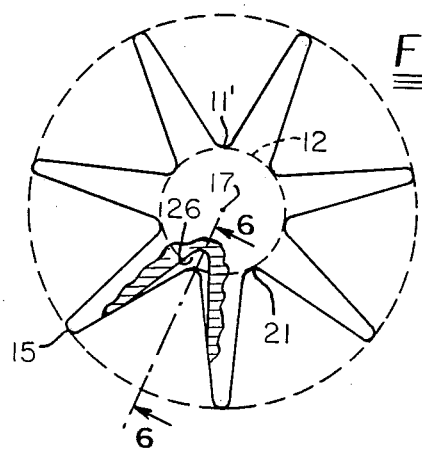
FIG. 4 is an enlarged cross-sectional view similar to FIG. 2 and depicting a second embodiment of the invention.
Figure 6:
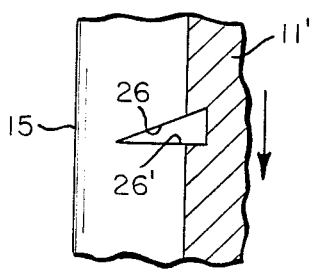
FIG. 6 is a cross-sectional view taken along line 6—6 of FIG. 4.
Figure 5:
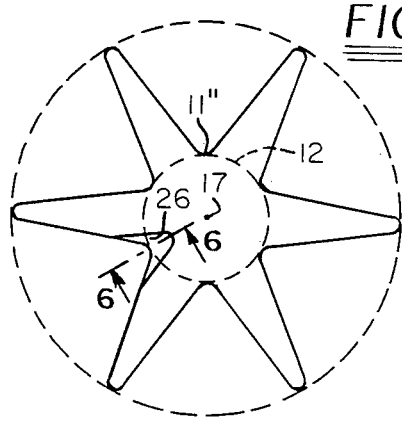
FIG. 5 is an enlarged cross-sectional view similar to FIG. 2 and depicting a third embodiment of the invention and showing locking serrations in the cups.

The fastener in accord with another embodiment of the invention is depicted in FIG. 4 and comprises a seven-pointed shank 11' or a six-pointed shank 11" as shown in FIG. 5. As seen in FIGS. 5 and 6, shoulder means in the form of depressions 26 somewhat similar to the concepts of the ring shank nail can be made in the shank 11 of the fastener 10 to take advantage thereof and even further enhance the holding power of the fastener 10 in accord with this invention. These shoulder means 26 provide a shoulder 26' against which the wood fibers engage to inhibit removal of the fastener 10 and the depressions may span the base 21 of the cup 20 from about a quarter of the length of the fins 14, as shown in FIGS. 5 and 6, to about one-half the length thereof, as shown in FIG. 4, and preferably extend inwardly into the central core 12. While a ring shank nail has some increased holding power it is readily apparent that when the shank of the greatest diameter enters the wood and each rib thereafter follows, the ring shank causes an effect similar to a rasp in an opening and creates uneven holding power throughout the length of the shank. The improved nail herein provides less rasping effect and more uniform holding power throughout its length.

Of course, with the cups 20 and outer edge 15, the improved fastener 10 inhibits rotative relative movement between the fastener and the wood to which it is driven as well as lateral movement as between a pair of wood materials joined by the improved fastener. Such attributes are not features of a ring shank nail. Another important feature of the improved fasteners according to the invention is provided by the use of a substantial reduction of fifty percent (50%) of the steel or the like to fabricate the shank 11 than the common nail without materially reducing the beam of the nail and increasing its holding power and providing lateral movement resistance. Furthermore, it is easier to drive in the improved fastener 10 due to its smaller cross-sectional area and such small area even provides less wood splitting and/or "fish-eyes". There is also less bending of the improved fastener 10 as compared to a common round nail of equal radius from axis 17 to edge 15.

Figure 7:
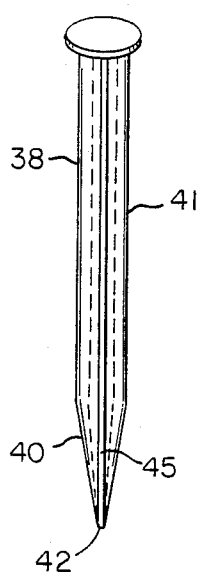
FIG. 7 is an isometric view of the fastener in accord with a fourth embodiment of the invention.
Figure 8:
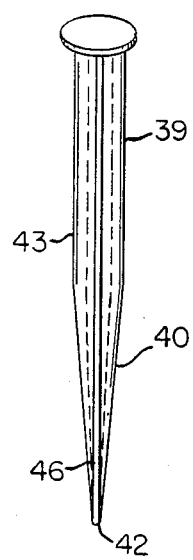
FIG. 8 is an isometric view of the fastener in accord with a fifth embodiment of the invention.
Figure 9:
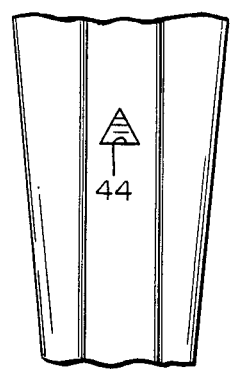
FIG. 9 is an enlarged partial plan view of the fastener of FIG. 8 showing serrations in the cups.

In FIGS. 7 and 8 the embodiments of the improved fasteners 38 and 39 are seen to include a lower end portion 40 which is tapered from the shank 41 to its extremity 42 by an angle of less than fourteen degrees so that the locking effect produced thereby further enhances the holding power of the fasteners 38 and 39. In FIG. 7 the tapered end portion 40 extends about one-quarter the length of shank 41 while the taper depicted in FIG. 8 is about one-half the length of shank 43. To even greater enhance the holding power, the shoulder means 44, substantially identical to shoulder means 26, described in connection with FIGS. 5 and 6, may be employed, as illustrated in FIG. 9, spaced along the vertical cups 45 and 46 in tapered end portions 40 of respective shanks 41 and 43. Likewise such shoulder means 44 may extend throughout the length of the shanks 41 and 43 of respective nails 38 and 39, if found to be desirable.

Figure 10:
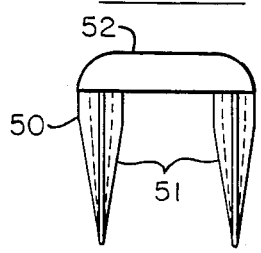
FIG. 10 is an isometric view of the fastener in form of a staple in accord with a sixth embodiment of the invention.
Figure 11:
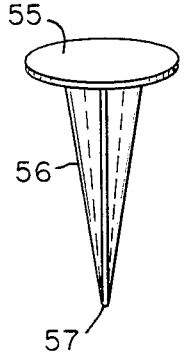
FIG. 11 is an isometric view of the fastener in the form of a roofing nail in accord with a seventh embodiment of the invention.

It is understood that the fastener in accord with this invention may be in the form of staple 50 (FIG. 10) having a pair of substantially parallel shanks 51 and a bridging head portion 52. Each shank 51 has a cross-section of at least a five-pointed star, as previously described in connection with FIG. 1, and may include the shoulder means 26 of FIGS. 5 and 6, and/or the taper as described in FIGS. 7 and 8, or fully tapered as illustrated in FIG. 11. Whether head portion 52 is round or flat or includes the elongated cups 45 and 46 or shoulder means 44 may be determined as needed without departing from the spirit or scope of the improved fastener herein described.

In FIG. 11 another embodiment of the fastener in the form of a roofing fastener 55 is depicted as having a cross-section of at least a five-pointed star and showing a substantially full tapered shank 56 with a slightly blunted end 57.

Similarly, shoulder means like those illustrated at 26 in FIGS. 5 and 6 or shoulder means 44 in FIG. 9, could be employed in the fastener 55 of FIG. 11. The fastener 55 may also be hardened as by heat treatment to provide a concrete fastener. Several of the fasteners described herein are suitable for use with drywall applications, paneling and the like materials as well. Since it is intended to work or form the fasteners herein described, they will have a greater shear and tensile strength with greater bending resistance. In some applications previously requiring heat treated nails, the fasteners according to this invention may be usable in lieu of such other nails.

Figure 12:
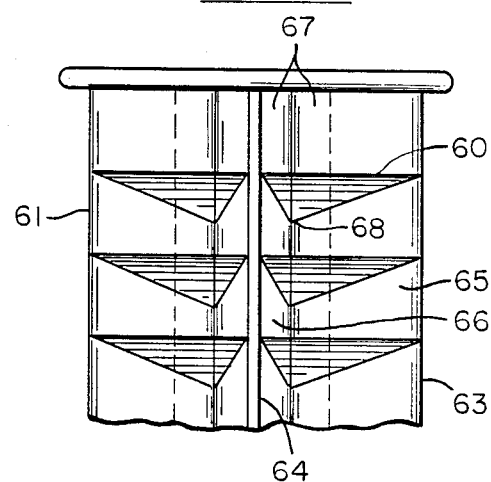
FIG. 12 is a partial side elevational view of the fastener in accord with an eighth embodiment of the invention.
Figure 13:
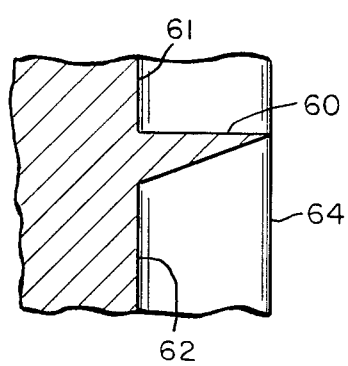
FIG. 13 is a partial cross-sectional view of the fastener taken along a plane through the shank thereof equidistant of a pair of edges.

It is contemplated that the shoulder means may be protrusions or a bulging out form as illustrated by shoulders 60, as shown in FIGS. 12 and 13, spaced along the shank 61 from core 62 tapering radially to the edges 63 and 64 of the adjacent facing sides 65 and 66 of the cup 67 formed therebetween and tapering downwardly to merge with core 62 at valley 68. Since shoulders 60 extend outwardly more in the nature of a ring shank nail, this embodiment of the invention would tend to produce more rasping effect than the embodiment of the invention depicted and described in connection with FIGS. 4 and 6. However, it is to be understood that since the fastener herein is intended to be formed, the protrusions 60 are quite different than the ring shank nail in which a cutting action is used to cut the rings thereinto from a common round nail. This cutting action causes substantial weakening of the ring shank nail, i.e., pointed ring breaking or cut creating increased fracture points or lines causing the shank to bend more easily or break during driving thereof and/or removal.

Also, the shoulder means, protrusions 60, may be added or deleted from the shanks as determined to provide maximum holding power or withdrawal resistance according to different woods (hard, medium, soft) or into materials having a uniform or uneven grain or a material having no grain effect like drywall made of gypsum or the like. Furthermore, it is to be understood that the cup angle and radius of the core may be adjusted to increase or decrease the cross-sectional area and/or modify the resistive contact between the fastener and the material with corresponding changes in the compression and cam locking effects and with addition or selective placement of shoulder means and/or tapering ends to obtain the maximum holding power, if desired, and maximum tensile and shear. In other words, the shape and other features of the improved fastener may be adjusted to become equal to or the same strength as the material in which the fastener is being used, if found desirable for particular applications.

Figure 14:
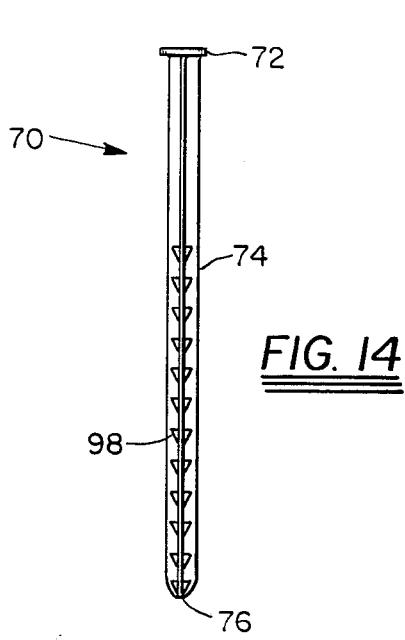
FIG. 14 is an isometric view of the fastener in the form of a nail in accord with the final embodiment of the invention.

Referring now to FIG. 14, there it will be seen that still another embodiment of the improved star nail is denoted 70 as a whole. Nail 70 has a head portion 72, a shank portion 74, and a point means 76.

Figure 16:
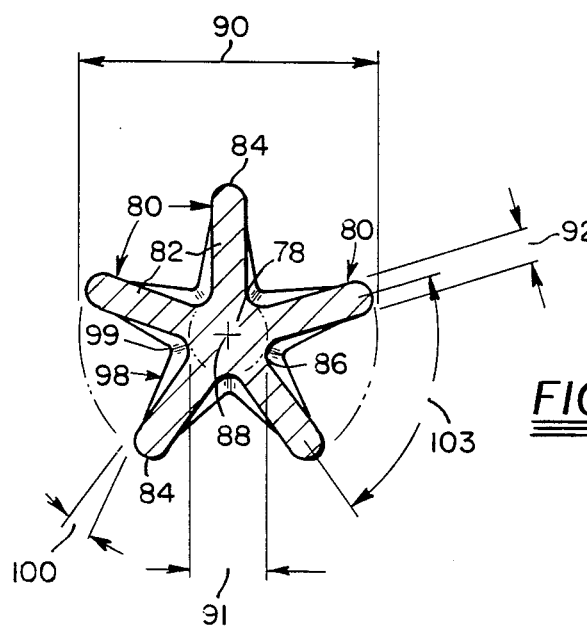
FIG. 16 is an enlarged cross-sectional view taken along line 16—16 of FIG. 15.

The shank portion 74 of nail 70 is seen in transverse section in FIG. 16. Shank 74 includes a central core 78 and a plurality of fin members, collectively designated 80, which radiate therefrom.

An imaginary circle coincident with the radially outermost edges of fins 80 has a diameter about four times greater than the diameter of central core 78.

Fins 80 are angularly disposed at a 72 degree angle relative to each other. This angle is believed to be the optimal angle between fins 80 because smaller angles produce a scalloped fin surface. Larger fin-included angles require larger core diameters and tapered fins, as shown in the first embodiment of this invention.

Specifically, an imaginary circle coincident with the radially outermost edges of fins 14 (FIG. 2) has a diameter about three times greater than the diameter of central core 12. The upper limit of the fin-included angle is believed to be about 98 degrees; greater angles produce a daisy petal effect in the individual fins, i.e., the fins become bulbous.

Fin members 80 are equidistantly and circumferentially spaced relative to each other and have a common length, width, and height, as shown. More specifically, each fin 80 has a pair of parallel side walls 82 and terminates at its radially outermost end in a rounded surface 84.

Accordingly, an elongate bight 86 is formed between each pair of contiguous fins 80, along the extent of shank 74. The longitudinal axis of symmetry of nail 70 is denoted 88 in FIG. 15; the proximal, i.e., radially innermost, and the distal, i.e., radially outermost, portions of the fins 80 are respectively equidistantly spaced from said longitudinal axis.

A commercial embodiment of the present invention, as shown in FIG. 16, has a diameter 90 of 0.196 inch; the width 92 of fins 80 is 0.0218 inch.

More specifically, the width of each fin 80 is about twice the diameter 91 of central core 78.

This embodiment of the invention is perhaps best understood by contrasting it with the commercial embodiment of the star nail shown in FIG. 2.

The star nail shown in transverse section in FIG. 2 has a diameter of 0.148 inch. The angle between the tapered fins 14 is about 98 degrees, i.e., the fins are generally perpendicular to each other as aforesaid. Moreover, the diameter of core 12 of nail 10 is larger than the diameter of core 78 of this embodiment.

It has been discovered that the steps of: (1) reducing the diameter of core 12 of fastener 10; (2) changing the tapered fins 14 of FIG. 2 to the uniform width fins 80 of FIGS. 14–16; (3) adding to said uniform width fins 80 the material made available by reducing said core diameter; and (4) reducing the angle between the fins from about 98 degrees to about 72 degrees, results in a nail that presents a greater surface area to the wood into which it is driven vis a vis the nail of FIG. 2 while using the same amount of material.

Figure 17:
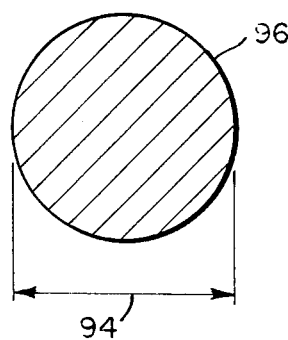
FIG. 17 is an enlarged cross-sectional view of a common round shank nail.

That this embodiment represents a culmination of inventive effort is perhaps even better understood in comparing the nails of FIGS. 2 and 14–16 with the common nail shown in transverse section in FIG. 17.

The diameter 94 of common nail shank 96 is 148 inches, the same diameter as the shank of the nail of FIG. 2. However, the star configuration of nail 10 (FIG. 2) provides a wood-engaging surface area about 15% greater than the surface area of the common nail 96, as stated hereinabove.

Moreover, this increase in surface area is accompanied by a concomitant decrease in materials used, i.e., the nail of FIG. 2 is fabricated from half the material as the nail of FIG. 17.

Figure 15:
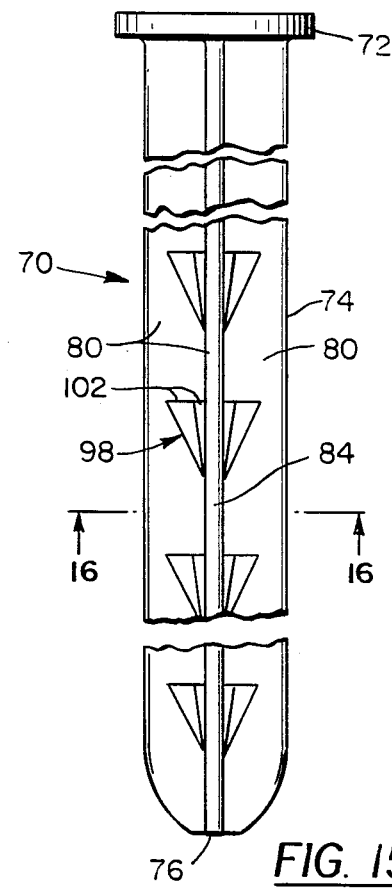
FIG. 15 is an enlarged view of broken away portions of the nail shown in FIG. 14.

This material saving is continued in the present embodiment of FIGS. 14–16; the surface area is increased about 86% percent beyond that of the common round shank nail 96 and about 60% percent beyond that of the nail of FIG. 2.

The tensile strength of the present nail (which is cold worked) is about 120,000–150,000 pounds per square inch whereas the tensile strength of the common round shank nail is about 40,000–60,000 pounds per square inch. The tensile strength can be increased another 10,000 pounds per square inch by aging the nail up to a year, or by baking the nail at 300 degrees Fahrenheit for about 10 minutes.

The economies made available by the improved nail are substantial. The 50% reduction in material results in a 50% reduction in weight. Not only is tensile strength not sacrificed, it is dramatically increased. All of this is accomplished in the substantial absence of loss of ductility and with a substantial gain in surface area.

Clearly, this invention represents a major breakthrough in the nail making art and is, accordingly, a pioneer invention. It follows as a matter of law that the claims which conclude this important disclosure are to be interpreted broadly so as to protect the heart of the invention.

The fasteners of this invention are made from standard drawn wire. The wire is roll formed using five rollers to form the shank. A small area used to head the fastener is not rolled. The resulting fastener has a uniform tensile strength throughout its longitudinal length.

The wire employed can be 1040 cold drawn or with lower carbon content to 1006 wire. Alternate substances such as brass, aluminum and stainless steel also can be used for the wire stock.

Conventional nails have a microfinish of about 8-30 units (a microfinish unit indicates relative smoothness, with low numbers indicating relatively smooth surfaces such as the surfaces of conventional nails and higher numbers indicating rougher surfaces such as sandpaper surfaces).

The present invention provides nails having a microfinish of about 30-120 units. The nail-contacting edges of the cold working rollers that are used to form the novel nail are roughened by acid washing, sandblasting, peening or machining, and the roughened edges emboss the nail's shank during the cold working process to enhance the nail's ability to withstand retraction.

The concave bights which are shown in FIGS. 2 and 16 where the respective fins join the respective central cores of the fasteners are also worthy of note in that some finned fasteners of the prior art have convexities instead of concavities where the fins join the central core. Such prior art fasteners are apparently drawn through dies. They do not have the 3:1 and 4:1 overall diameter (i.e., imaginary circle diameter) to core diameter ratios achieved by the present invention and thus do not provide the dramatic increase in surface area achieved by the present invention.

Plural barb members 98 are longitudinally spaced along the extent of shank 74 and serve to defeat facile retraction of fastener 70 from its seated position.

As perhaps best seen in FIGS. 15 and 16, each barb 98 includes a concave bight 99. Each barb has two arms which extend from the bight 99 as shown, and which merge along their respective radial extents into sidewalls of their associated fin members as shown. The included angle of the bight is about 84° in that angle 100 is about 12°, preferably; it may vary widely. Each barb arm also merges into the sidewalls of its associated fin member along its longitudinal extent as well, as shown in FIGS. 14 and 15.

The barb effect is provided by flats 102 that project orthogonally relative to their associated fin sidewalls; the aforementioned radial and longitudinal mergers of the barbs and the fin sidewalls facilitates easy driving of the fastener. The novel fasteners 70 may also be provided without barbs 98.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A fastener such as a nail having a shank with a transverse cross section in the form of a five pointed star and wherein five linear in configuration fins extend radially from a central core of said shank at equidistantly and circumferentially spaced intervals to define a common fin-included angle between each contiguous pair of fins and wherein a diameter of an imaginary circle coincident with the radially outermost edges of said fins is about three times greater than a diameter of said central core.

2. The nail of claim 1 wherein said common fin-included angle is about 98 degrees.

3. The nail of claim 2, wherein each of said fins is tapered.

4. The nail of claim 1, wherein the surface area of said shank is about 17% greater than the surface area of a nail of comparable size having a shank with a round cross-section.

5. The nail of claim 1, wherein said nail is cold-rolled and has a tensile strength of about 120,000-150,000 pounds per square inch.

6. The nail of claim 1, wherein the weight and quantity of material used to form said nail is about ½ the weight and quantity of material used to form a comparable size nail having a shank with a round cross section.

7. The nail of claim 1, wherein an elongate concave bight is formed along the extent of said shank where contiguous fins join said central core.

8. The nail of claim 7, further comprising a plurality of longitudinally spaced barb members formed along the extent of said shank, each of said barb members projecting radially outwardly with respect to said concave bight to form a shoulder means that resists facile retraction of said nail from a material into which it is driven.

9. The nail of claim 8, wherein each of said barb members includes a pair of radial arm members that gradually merge along their respective radial extents with their associated fins.

10. The nail of claim 9, wherein each of said arm members includes a longitudinally extending portion that extends longitudinally along the extent of said shank and wherein each of said longitudinally extending portions of said arm members gradually merges with said shank.

11. The nail of claim 10, wherein each of said shoulder means comprises a flat wall disposed orthogonally to the bight of said shank.

12. The nail of claim 11, wherein an angle between said arm members is about 12 degrees less than said fin-included angle.

13. A fastener such as a nail having a shank with a transverse cross section in the form of a five pointed star and wherein five linear in configuration fins extend radially from a central core of said shank at equidistantly and circumferentially spaced intervals to define a common fin-included angle between each contiguous pair of fins and wherein a diameter of an imaginary circle coincident with the radially outermost edges of said fins is about four times greater than a diameter of said central core.

14. The nail of claim 13, wherein said common fin-included angle is about 72 degrees.

15. The nail of claim 13, wherein each of said fins has a uniform width.

16. The nail of claim 15, wherein the uniform width of said fins is about twice the diameter of said central core.

17. The nail of claim 13, wherein the surface area of said shank is about 86% greater than the surface area of a nail having a shank with a round cross section.

18. The nail of claim 13, wherein said nail is cold-rolled and has a tensile strength of about 120,000–150,000 pounds per square inch.

19. The nail of claim 13, wherein the weight and quantity of material used to form said nail is about one-half the weight and quantity of material used to form a nail of comparable size having a round cross section shank.

20. The nail of claim 13, wherein an elongate concave bight is formed along the extent of said nail shank where contiguous fins join said central core.

21. The nail of claim 20, further comprising a plurality of longitudinally spaced barb members formed along the extent of said shank, each of said barb members projecting radially outwardly with respect to said concave bight to form a shoulder means that resists facile retraction of said nail from a material into which it is driven.

22. The nail of claim 21, wherein each of said barb members includes a pair of radial arm members that gradually merge along their respective radial extents with their associated fins.

23. The nail of claim 22, wherein each of said arm members includes a longitudinally extending portion that extends longitudinally along the extent of said shank and wherein each of said longitudinally extending portions of said members gradually merges with said shank.

24. The nail of claim 23, wherein each of said shoulder means comprises a flat wall disposed orthogonally to the bight of said shank.

25. The nail of claim 24, wherein an angle between said arm members is about 12 degree less than said fin-included angle.

26. A fastener such as a nail having a shank with a cross section in the form of at least a three pointed star and wherein linear in configuration fins extend radially from a central core of said shank at equidistantly and circumferentially spaced intervals to define a common fin-included angle between each contiguous pair of fins and wherein an imaginary circle coincident with the radially outermost edges of said fins has a diameter about between three to four times greater than the diameter of said central core.

27. The nail of claim 26, wherein the number of fins is five and wherein the fin-included angle is between 72 degrees–98 degrees.

28. The nail of claim 26, wherein said nail is cold-rolled and has a tensile strength of about 120,000–150,000 pounds per square inch.

29. The nail of claim 26, wherein an elongate bight is formed along the extent of said nail shank where contiguous fins join said central core.

30. The nail of claim 29, further comprising a plurality of longitudinally spaced barb members formed along the extent of said shank, each of said barb members projecting radially outwardly with respect to said concave bight to form a shoulder means that resists facile retraction of said nail from a material into which it is driven.

31. The nail of claim 30, wherein each of said barb members includes a pair of radial arm members that gradually merge along their respective radial extents with their associated fins.

32. The nail of claim 31, wherein each of said arm members includes a longitudinally extending portion that extends longitudinally along the extent of said shank and wherein each of said longitudinally extending portions of said arm members gradually merge with said shank.

33. The nail of claim 32, wherein each of said shoulder means comprises a flat wall disposed orthogonally to the bight of said shank.

34. The nail of claim 33, wherein an angle between said arm members is about 12 degrees less than said fin-included angle.

35. A nail, comprising:
a head member;
an elongate shank member integral with said head member;
said shank member having an elongate central core;
said shank member further including a plurality of radially extending linear in configuration fin members integral to said central core;
each of said fin members having a common radial extent and being equidistantly and circumferentially spaced with respect to each other, to define a common fin-included angle between adjacent fin members, and there being an imaginary circle coincident with the radially outermost edges of said fin members;
said fin-included angle having a lower limit of about 72 degrees and an upper limit of about 98 degrees;
and the diameter of the said central core having a lower limit of about ¼ the diameter of said imaginary circle and an upper limit about ⅓ the diameter of said imaginary circle.

36. The nail of claim 35, wherein said nail is cold-rolled and has a tensile strength of about 120,000–150,000 pounds per square inch.

37. The nail of claim 35, wherein the weight and quantity of materials used to form said nail is about one-half the weight and quantity of material used to form a comparable size nail having a shank with a round cross section.

38. The nail of claim 35, wherein an elongate bight is formed along the extent of said nail shank where contiguous fins join said central core.

39. The nail of claim 35, said nail shank having a surface area greater than the surface area of a comparable round shank nail, said surface area being about 17% greater than said round shank surface area when said central core is about one-third the diameter of said imaginary circle and said surface area being about 86% greater than said round shank surface area when said central core is about one-fourth the diameter of said imaginary circle.

40. The nail of claim 38, further comprising a plurality of longitudinally spaced barb members formed along the extent of said shank, each of said barb members projecting radially outwardly with respect to said concave bight to form a shoulder means that resists facile retraction of said nail from a material into which it is driven.

41. The nail of claim 40, wherein each of said barb members includes a pair of radial arm members that gradually merge along their respective radial extents with their associated fins such that a bight portion of each of said barb members is disposed further radially outwardly than said arm members.

42. The nail of claim 41, wherein each of said arm members includes a longitudinally extending portion that extends longitudinally along the extent of said shank and wherein each of said longitudinally extending portions of said arm members gradually merge with said shank.

43. The nail of claim 42, wherein each of said shoulder means comprises a flat wall disposed orthogonally to the bight of said shank.

44. The nail of claim 43, wherein an angle between said arm members is about 12 degrees less than said fin-included angle.

* * * * *